US012689667B2

(12) United States Patent
Han et al.

(10) Patent No.: US 12,689,667 B2
(45) Date of Patent: *Jul. 21, 2026

(54) CONTENT MONITORING FOR VIRTUAL MEETING ROOMS

(71) Applicant: Zoom Video Communications, Inc., San Jose, CA (US)

(72) Inventors: Lin Han, Los Altos, CA (US); Nitasha Walia, Cupertino, CA (US); Tain Barzso, Fremont, CA (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/787,984

(22) Filed: Jul. 29, 2024

(65) Prior Publication Data

US 2024/0388614 A1 Nov. 21, 2024

Related U.S. Application Data

(63) Continuation of application No. 18/094,712, filed on Jan. 9, 2023, now Pat. No. 12,074,929, which is a
(Continued)

(51) Int. Cl.
*H04L 65/403* (2022.01)
*H04L 12/18* (2006.01)
*H04L 65/401* (2022.01)

(52) U.S. Cl.
CPC ........ *H04L 65/403* (2013.01); *H04L 12/1813* (2013.01); *H04L 12/1822* (2013.01); *H04L 65/401* (2022.05); *H04L 65/4015* (2013.01)

(58) Field of Classification Search
None
See application file for complete search history.

(56) References Cited

U.S. PATENT DOCUMENTS 7,515,703 B1 * 4/2009 Grigsby ................. H04M 3/56
367/901
8,589,487 B1 * 11/2013 Reeves ............... H04L 65/1069
709/204
(Continued)

FOREIGN PATENT DOCUMENTS

CN 111478905 A 7/2020

OTHER PUBLICATIONS

U.S. Appl. No. 17/246,225 , "Advisory Action", May 13, 2022, 5 pages.

(Continued)

*Primary Examiner* — Backhean Tiv
(74) *Attorney, Agent, or Firm* — Kilpatrick Townsend & Stockton LLP

(57) ABSTRACT

One example system for providing virtual meeting room content monitoring for a host of a videoconference includes a processor and at least one memory device. The memory device includes instructions that can cause the processor to establish a videoconferencing session having a first virtual meeting room. The processor receives a control input from a host subscribed to the first virtual meeting room at a host client device. The control input indicates that the host is to monitor the meeting room content from one or more additional virtual meeting rooms. The instructions further cause the processor to, responsive to the control input from the host, cause the meeting room content of at least one of the additional virtual meeting rooms to be displayed on the host client device while the host is subscribed to the first virtual meeting room.

20 Claims, 8 Drawing Sheets

Related U.S. Application Data continuation of application No. 17/246,225, filed on Apr. 30, 2021, now Pat. No. 11,558,436.

(56) References Cited

U.S. PATENT DOCUMENTS

| | | | | |
|---|---|---|---|---|
| 8,917,847 | B2* | 12/2014 | Mai | H04M 3/563 |
| | | | | 709/204 |
| 8,958,536 | B2* | 2/2015 | Charish | H04L 12/1822 |
| | | | | 379/202.01 |
| 9,307,089 | B2* | 4/2016 | Nasir | H04M 3/56 |
| 9,325,940 | B2* | 4/2016 | Smelyansky | G09B 5/065 |
| 9,467,649 | B2* | 10/2016 | Xie | H04L 65/1083 |
| 9,544,542 | B2* | 1/2017 | Sakurai | H04L 12/1822 |
| 9,774,824 | B1* | 9/2017 | Brady | H04W 4/80 |
| 9,961,119 | B2* | 5/2018 | Bader-Natal | H04N 7/157 |
| 9,973,551 | B2* | 5/2018 | Ouyang | H04L 67/54 |
| 10,187,435 | B2* | 1/2019 | Yin | H04L 65/80 |
| 10,284,609 | B2* | 5/2019 | Malatesha | H04L 65/403 |
| 10,360,894 | B1 | 7/2019 | Rakshit et al. | |
| 10,505,998 | B1* | 12/2019 | Ackerman | H04L 65/4015 |
| 10,511,643 | B2* | 12/2019 | Faulkner | H04L 65/403 |
| 10,541,824 | B2* | 1/2020 | Bader-Natal | H04L 12/1827 |
| 11,132,110 | B1* | 9/2021 | Christensen | H04N 7/15 |
| 11,184,560 | B1* | 11/2021 | Mese | G10L 17/00 |
| 11,265,181 | B1* | 3/2022 | Springer | H04N 21/4318 |
| 11,336,865 | B1* | 5/2022 | Han | H04N 7/152 |
| 11,343,293 | B1* | 5/2022 | Slotznick | H04N 5/272 |
| 11,444,795 | B1* | 9/2022 | Patel | H04L 12/1822 |
| 11,503,163 | B2* | 11/2022 | Liu | H04L 65/1083 |
| 11,558,436 | B2* | 1/2023 | Han | H04N 7/157 |
| 11,621,861 | B2* | 4/2023 | Faulkner | H04L 12/1822 |
| | | | | 709/204 |
| 11,637,877 | B1* | 4/2023 | Zhu | H04N 7/15 |
| | | | | 348/14.03 |
| 11,816,308 | B2* | 11/2023 | Rice | G06F 3/0483 |
| 12,074,929 | B2* | 8/2024 | Han | H04L 65/401 |
| 2005/0034079 | A1* | 2/2005 | Gunasekar | H04N 7/152 |
| | | | | 715/756 |
| 2007/0203980 | A1* | 8/2007 | Andersen | G06Q 10/10 |
| | | | | 709/204 |
| 2007/0299710 | A1* | 12/2007 | Haveliwala | G06Q 10/10 |
| | | | | 705/7.19 |
| 2007/0300165 | A1* | 12/2007 | Haveliwala | G06F 3/0482 |
| | | | | 715/810 |
| 2008/0267095 | A1* | 10/2008 | Sekaran | H04L 12/66 |
| | | | | 370/260 |
| 2010/0017719 | A1* | 1/2010 | Majors | H04N 7/147 |
| | | | | 715/753 |
| 2010/0220172 | A1* | 9/2010 | Michaelis | H04N 21/44016 |
| | | | | 348/14.08 |
| 2011/0019810 | A1 | 1/2011 | Alexandrov et al. | |
| 2011/0149811 | A1* | 6/2011 | Narayanaswamy | H04L 67/02 |
| | | | | 370/261 |
| 2011/0179157 | A1 | 7/2011 | Beers et al. | |
| 2011/0271212 | A1* | 11/2011 | Jones | H04M 3/567 |
| | | | | 715/753 |
| 2012/0110475 | A1* | 5/2012 | Han | H04L 12/1818 |
| | | | | 715/753 |
| 2012/0182384 | A1* | 7/2012 | Anderson | H04N 7/157 |
| | | | | 348/14.09 |
| 2012/0218373 | A1 | 8/2012 | N'Guessan | |
| 2013/0195260 | A1* | 8/2013 | Barsoba | H04L 12/1822 |
| | | | | 379/88.14 |
| 2013/0198629 | A1* | 8/2013 | Tandon | H04L 65/765 |
| | | | | 715/716 |
| 2013/0208881 | A1 | 8/2013 | Pande et al. | |
| 2013/0329866 | A1* | 12/2013 | Mai | H04M 3/563 |
| | | | | 379/88.01 |
| 2014/0267550 | A1* | 9/2014 | Nimri | H04N 7/152 |
| | | | | 348/14.09 |
| 2014/0362165 | A1* | 12/2014 | Ackerman | G06Q 10/10 |
| | | | | 348/14.07 |
| 2015/0189231 | A1 | 7/2015 | Yang et al. | |
| 2015/0288924 | A1* | 10/2015 | Liu | G06V 40/174 |
| | | | | 348/14.08 |
| 2016/0088259 | A1* | 3/2016 | Anderson | H04L 65/1083 |
| | | | | 348/14.03 |
| 2016/0234268 | A1* | 8/2016 | Ouyang | H04L 67/54 |
| 2016/0299671 | A1* | 10/2016 | An | G06Q 10/10 |
| 2018/0329521 | A1* | 11/2018 | Hesketh | H04N 7/15 |
| 2018/0337963 | A1* | 11/2018 | Faulkner | H04L 65/403 |
| 2018/0375676 | A1* | 12/2018 | Bader-Natal | H04M 3/567 |
| 2020/0302817 | A1 | 9/2020 | Williams et al. | |
| 2020/0304547 | A1* | 9/2020 | Lu | H04L 65/1063 |
| 2020/0382618 | A1* | 12/2020 | Faulkner | H04L 65/403 |
| 2021/0258427 | A1* | 8/2021 | Lee | H04L 12/1831 |
| 2022/0191258 | A1* | 6/2022 | Sharp | H04N 7/152 |
| 2022/0271962 | A1* | 8/2022 | Patel | G06F 3/167 |
| 2022/0353311 | A1* | 11/2022 | Lee | H04L 12/1827 |
| 2022/0368733 | A1* | 11/2022 | Lu | G06F 3/04842 |
| 2023/0344883 | A1* | 10/2023 | Zhu | H04L 65/4015 |
| 2024/0388614 | A1* | 11/2024 | Han | H04N 7/157 |

OTHER PUBLICATIONS

U.S. Appl. No. 17/246,225 , "Final Office Action", Feb. 4, 2022, 13 pages.

U.S. Appl. No. 17/246,225 , "Non-Final Office Action", Jun. 9, 2022, 16 pages.

U.S. Appl. No. 17/246,225 , "Non-Final Office Action", Oct. 15, 2021, 12 pages.

U.S. Appl. No. 17/246,225 , "Notice of Allowance", Sep. 15, 2022, 21 pages.

U.S. Appl. No. 18/094,712 , "Advisory Action", Oct. 25, 2023, 5 pages.

U.S. Appl. No. 18/094,712 , "Final Office Action", Aug. 22, 2023, 20 pages.

U.S. Appl. No. 18/094,712 , "Non-Final Office Action", Jan. 5, 2024, 17 pages.

U.S. Appl. No. 18/094,712 , "Non-Final Office Action", May 12, 2023, 17 pages.

U.S. Appl. No. 18/094,712 , "Notice of Allowance", Apr. 17, 2024, 11 pages.

Jenny , "Breakout Rooms in Zoom", Tech Documentation, Jan. 29, 2021, 6 pages.

Krohn , "Zoom Rolling out End-to-End Encryption Offering", Security & Privacy, Zoomtopia, Oct. 14, 2020, 3 pages.

PCT/US2022/024526 , "International Preliminary Report on Patentability", Nov. 9, 2023, 11 pages.

PCT/US2022/024526 , "International Search Report and Written Opinion", Jul. 22, 2022, 15 pages.

EP Office Action for EP22721196.8 dated May 7, 2026, 9 pages.

\* cited by examiner

700

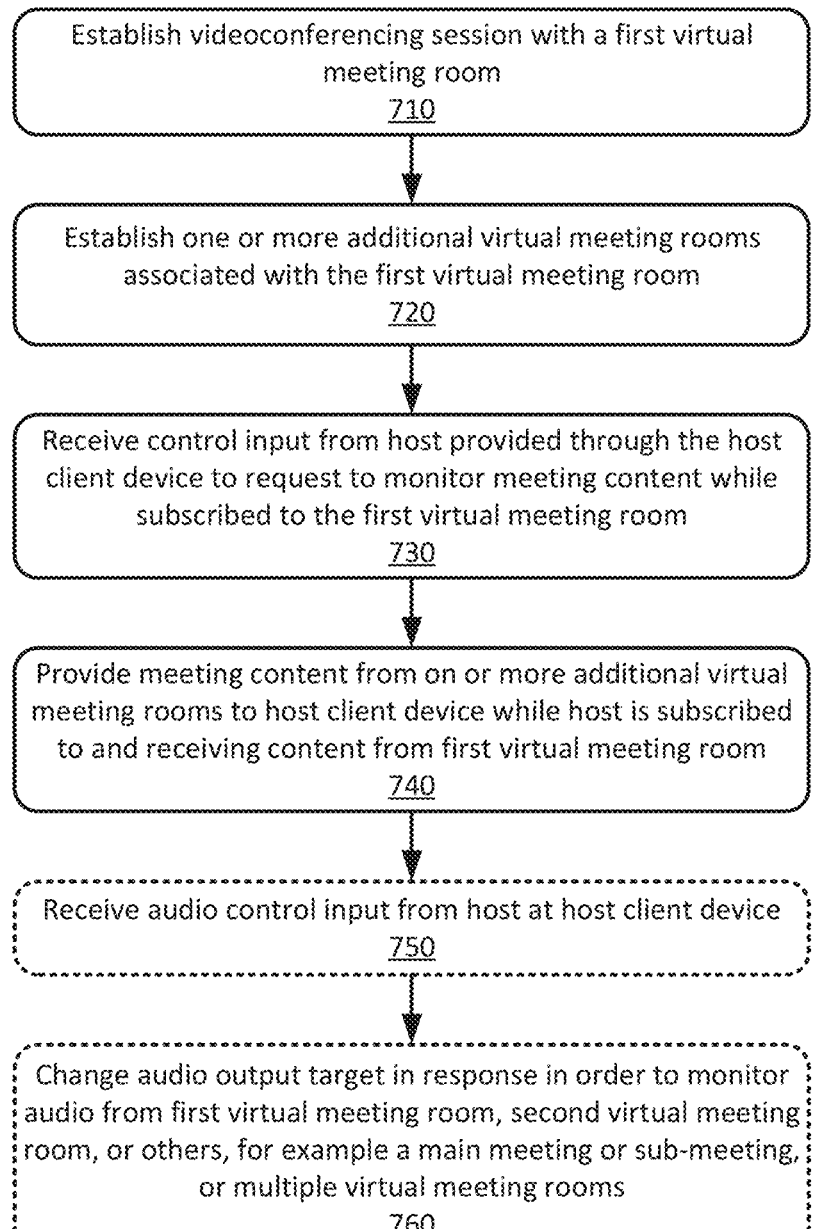

Establish videoconferencing session with a first virtual
meeting room
710

Establish one or more additional virtual meeting rooms
associated with the first virtual meeting room
720

Receive control input from host provided through the host
client device to request to monitor meeting content while
subscribed to the first virtual meeting room
730

Provide meeting content from on or more additional virtual
meeting rooms to host client device while host is subscribed
to and receiving content from first virtual meeting room
740

Receive audio control input from host at host client device
750

Change audio output target in response in order to monitor
audio from first virtual meeting room, second virtual meeting
room, or others, for example a main meeting or sub-meeting,
or multiple virtual meeting rooms
760

*FIG. 7*

CONTENT MONITORING FOR VIRTUAL MEETING ROOMS

RELATED APPLICATIONS

This application claims priority to U.S. Patent Application Ser. No. 18/094,712, entitled "CONTENT MONITORING FOR VIRTUAL MEETING ROOMS," filed on Jan. 9, 2023, which claims priority to U.S. Patent No. 11,558,436, entitled "CONTENT MONITORING FOR VIRTUAL MEETING ROOMS," filed on Apr. 30, 2021, the entirety of both of which is incorporated by reference herein.

FIELD

The present application generally relates to videoconferences and more particularly relates to systems and methods for providing a meeting host with content monitoring for virtual meeting rooms.

BACKGROUND

Videoconferencing has become a common way for people to meet as a group, but without being at the same physical location. Participants can be invited to a videoconference meeting, join from their personal computers or telephones, and are able to see and hear each other and converse largely as they would during an in-person group meeting or event. The advent of user-friendly videoconferencing software has enabled teams to work collaboratively despite being dispersed around the country or the world. It has also enabled families and friends to engage with each other in more meaningful ways, despite being physically distant from each other.

SUMMARY

Various examples are described for systems and methods for providing content monitoring for virtual meeting rooms. One example system includes a processor and at least one memory device. The memory device includes instructions that are executable by the processor to cause the processor to establish a videoconferencing session having a first virtual meeting room and establish a second virtual meeting room associated with the first virtual meeting room. The instructions are further executable by the processor to cause the processor to receive a monitoring control input from a host at a host client device, wherein the host is subscribed to the first virtual meeting room and at least one participant is subscribed to the second virtual meeting room. The monitoring control input is indicative of a request from the host to monitor meeting room content of at least the second virtual meeting room. The instructions are further executable by the processor to cause the processor to, responsive to the monitoring control input from the host, cause the meeting room content of the second virtual meeting room to be displayed on the host client device while the host is subscribed to the first virtual meeting room.

One example method includes establishing a videoconferencing session having a first virtual meeting room and establishing a second virtual meeting room associated with the first virtual meeting room. The example method further includes receiving a monitoring control input from a host at a host client device. The host is subscribed to the first virtual meeting room and at least one participant is subscribed to the second virtual meeting room. The monitoring control input is indicative of a request from the host to monitor meeting room content of at least the second virtual meeting room. The method further includes, responsive to the monitoring control input from the host, causing the meeting room content of the second virtual meeting room to be displayed on the host client device while the host is subscribed to the first virtual meeting room.

One example non-transitory computer-readable medium includes code that is executable by a processor for causing the processor to establish a videoconferencing session having a first virtual meeting room and establish a second virtual meeting room associated with the first virtual meeting room. The instructions are further executable by the processor to cause the processor to receive a monitoring control input from a host at a host client device, wherein the host is subscribed to the first virtual meeting room and at least one participant is subscribed to the second virtual meeting room. The monitoring control input is indicative of a request from the host to monitor meeting room content of at least the second virtual meeting room. The instructions are further executable by the processor to cause the processor to, responsive to the monitoring control input from the host, cause the meeting room content of the second virtual meeting room to be displayed on the host client device while the host is subscribed to the first virtual meeting room.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIG. 7 illustrate example methods for providing virtual meeting room content monitoring for a host of a videoconference.

DETAILED DESCRIPTION

Figure 1:
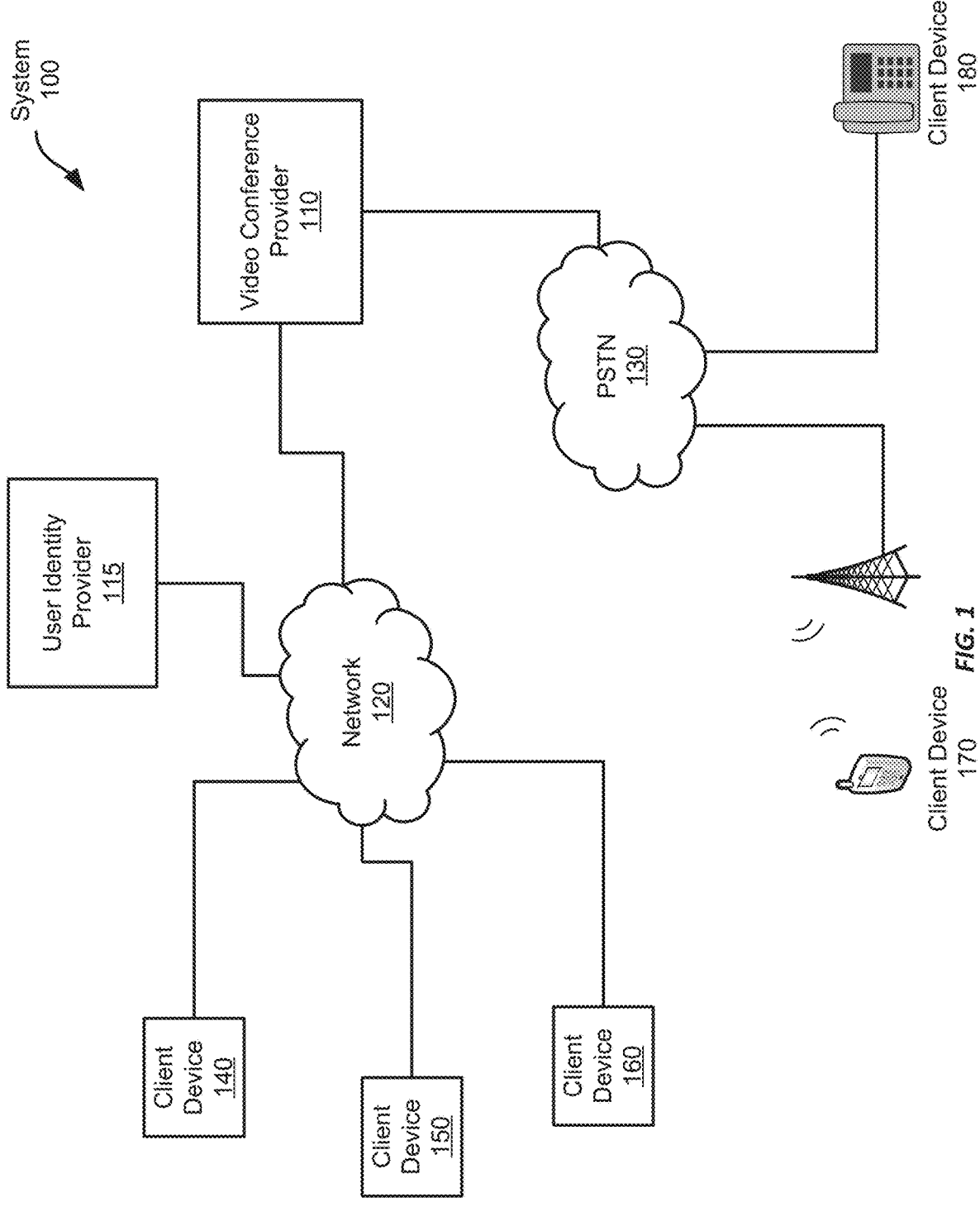
FIGS. 1-6 illustrate example systems to enable virtual meeting room content monitoring for a host of a videoconference.

Examples are described herein in the context of systems and methods for providing virtual meeting room content monitoring for a host of a videoconference. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Videoconferencing systems enable their users to create and attend videoconferences (or "meetings") via various types of client devices. After joining a meeting, the participants receive audio and video streams or feeds (or "multimedia" streams or feeds) from the other participants and are presented with views of the video feeds from one or more of the other participants and audio from the audio feeds. Using these different modalities, the participants can see and hear each other, engage more deeply, and generally have a richer experience despite not being physically in the same space.

To create a meeting, a person (referred to as the "host" or "meeting host") accesses the videoconferencing system, creates a new meeting, and identifies one or more other people to invite to the meeting. In response to the host creating the meeting, the videoconference system establishes the meeting by creating a meeting identifier and, if desired, a passcode or other access control information. The host can then send the meeting identifier (and access control information) to each of the invitees, such as by email. Once the meeting is started, the invitees can then access and join the meeting using the meeting identifier and any provided access control information. The initial, or main host can, in some systems, make another participant a co-host. For purposes of the discussion herein, the term "host" encompasses hosts and co-hosts. Hosts can manage and control the videoconferencing session. This control and management typically includes managing sub-meetings, sometimes referred to as "breakout rooms."

Sub-meeting commands may include commands to start a sub-meeting, move participants into a sub-meeting, move participants out of a sub-meeting, or end the sub-meeting. In addition to managing sub-meetings by issuing commands, a host can move from the main meeting to a sub-meeting in order to participate in any discussion or exchanges taking place in the sub-meeting.

In some environments, for example, in remote learning, a host may need to monitor activity taking place in one or more sub-meetings as well as in the main meeting. Such monitoring may be needed by an instructor acting as host in order to ensure that students are carrying out assigned activities, or in order to ensure that no disruptive behavior is taking place in any virtual meeting rooms. In order to monitor activities in the various virtual meeting rooms, the host can move from one virtual room to another and back again at some preplanned or random interval. For example, the host can move from a main meeting to a sub-meeting and back again over time. Alternatively, the host can make use of one or more assistants, who may or may not also be co-hosts of the videoconferencing session. Assistants can be present in virtual meeting rooms and report back to the host outside of the virtual meeting environment.

To provide more versatility and convenience for hosts managing virtual meeting rooms in a videoconferencing meeting, a videoconferencing system according to this disclosure enables content monitoring for a virtual meeting room such as a virtual room for a videoconferencing sub-meeting while a host is subscribed to another virtual meeting room, such as one for a main meeting. The content being monitored can include video from a monitored meeting room. The video can include, as examples, video of a participant who is speaking or is the focus of the meeting room being monitored, or shared content, such as documents or slides.

A videoconferencing system can provide sub-meeting content monitoring for a host in a main meeting or in another sub-meeting, or main meeting content monitoring for a host in a sub-meeting. In some examples, video content from two or more virtual meeting rooms can be concurrently displayed on a host client device. In some examples, a host can set an audio target of the host client device using an audio control input from the host. The audio target can be the virtual meeting room to which the host is subscribed, a virtual meeting room for which the host is monitoring video, or multiple virtual meeting rooms.

The techniques disclosed herein for providing virtual meeting room content monitoring provide convenience to users, since a host does not need to move between virtual meeting rooms over time, or rely on other to monitor virtual meeting room content. For example, a host such as an instructor in a virtual classroom environment can monitor activities in multiple virtual rooms concurrently without relying on teaching assistants or manually moving between virtual rooms over time.

This illustrative example is given to introduce the reader to the general subject matter discussed herein and the disclosure is not limited to this example. The following sections describe various additional non-limiting examples and examples of systems and methods for providing virtual meeting room content monitoring for a host of a videoconference.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in videoconferences hosted by the video conference provider 110. For example, the video conference provider 110 can be located within a private network to provide videoconferencing services to devices within the private network, or it can be connected to a public network, e.g., the internet, so it may be accessed by anyone. Some examples may even provide a hybrid model in which a video conference provider 110 may supply components to enable a private organization to host private internal videoconferences or to connect its system to the video conference provider 110 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
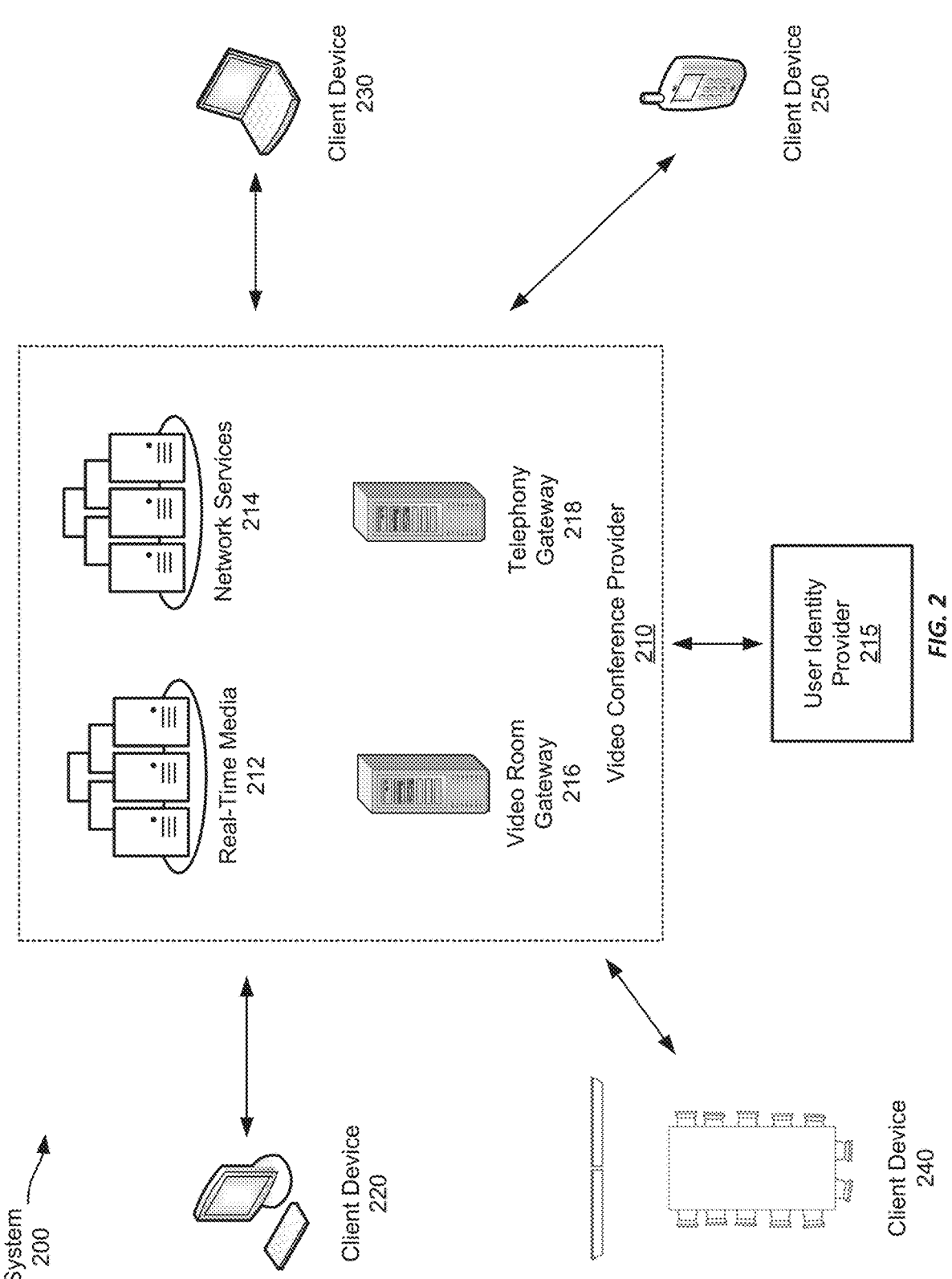

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The videoconference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated videoconferencing equipment. Each of these devices may provide both audio and video capabilities and may enable one or more users to participate in a videoconference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can making conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access videoconference services. After the call is answered, the user may provide information regarding a videoconference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based videoconferencing hardware to dedicated videoconferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a videoconference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of videoconference functionality, thereby enabling the various client devices to create and participate in videoconference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more videoconference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the videoconference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "breakout" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a breakout room for one or more meeting participants to join, such a command may also be handled by a network services server 214, which may create a new meeting record corresponding to the breakout room and then connect one or more meeting participants to the breakout room similarly to how it originally admitted the participants to the meeting itself.

In addition to creating and administering on-going meetings, the network services server(s) 214 may also be responsible for closing and tearing down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conference providers according to this description.

Referring now to the video room gateway servers 216, these servers 216 provide an interface between dedicated videoconferencing hardware, such as may be used in dedicated videoconferencing rooms. Such videoconferencing hardware may include one or more cameras and microphones and a computing device designed to receive video and audio streams from each of the cameras and microphones and connect with the video conference provider 210. For example, the videoconferencing hardware may be provided by the video conference provider to one or more of its subscribers, which may provide access credentials to the videoconferencing hardware to use to connect to the video conference provider.

The video room gateway servers 216 provide specialized authentication and communication with the dedicated videoconferencing hardware that may not be available to other client devices 220-230, 250. For example, the videoconferencing hardware may register with the video conference provider when it is first installed and the video room gateway may authenticate the videoconferencing hardware using such registration as well as information provided to the video room gateway server(s) 216 when dedicated videoconferencing hardware connects to it, such as device ID information, subscriber information, hardware capabilities, hardware version information etc. Upon receiving such information and authenticating the dedicated videoconferencing hardware, the video room gateway server(s) 216 may interact with the network services servers 214 and real-time media servers 212 to allow the videoconferencing hardware to create or join meetings hosted by the video conference provider 210.

Referring now to the telephony gateway servers 218, these servers 218 enable and facilitate telephony devices' participation in meetings hosed by the video conference provider. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
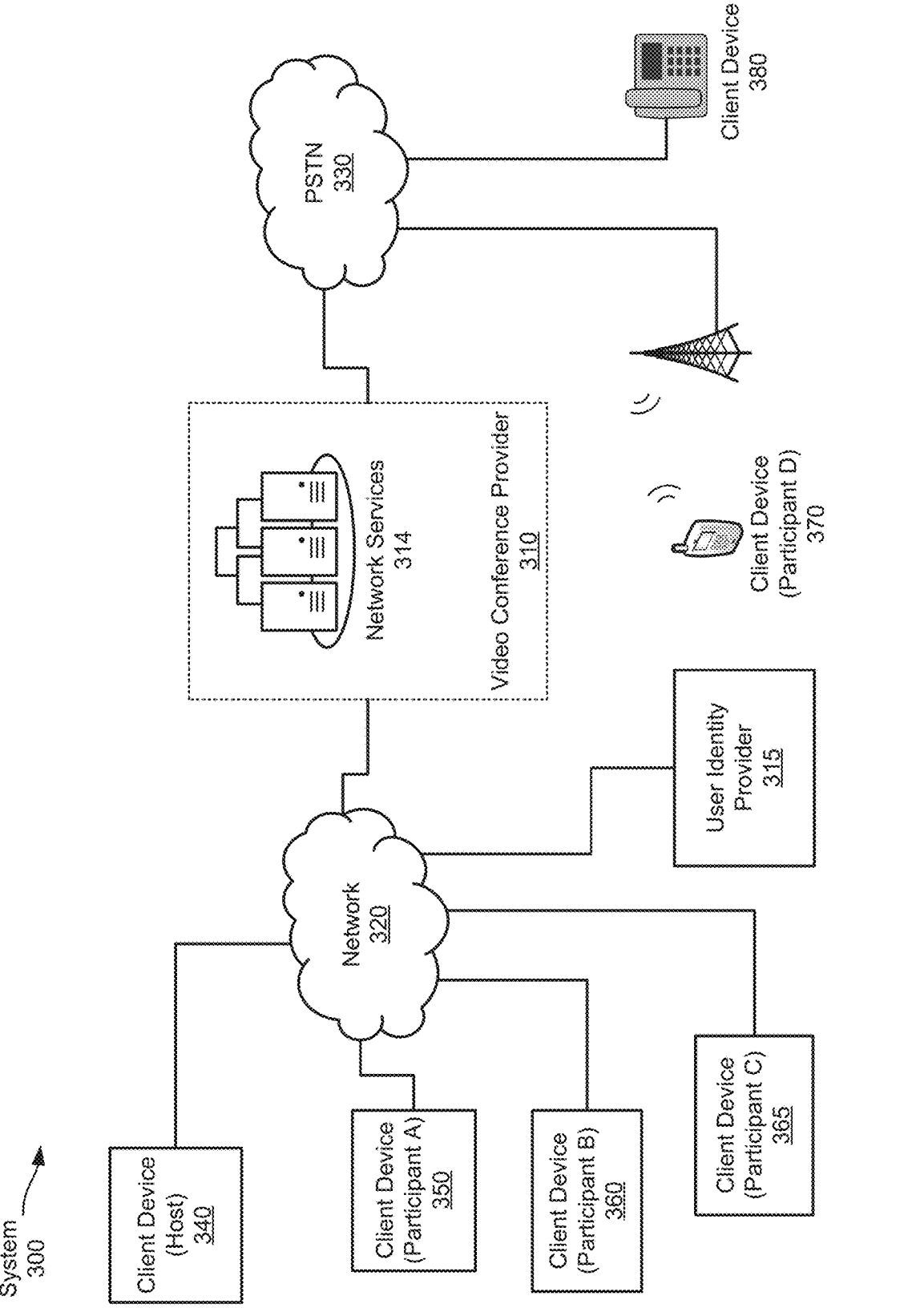

Referring now to FIG. 3, FIG. 3 illustrates an example system 300 including providing virtual meeting room content monitoring for the host of a videoconference. FIG. 3 includes components similar to those shown in FIGS. 1 and 2. In this example, the system 300 includes a public user identity provider 315 through which individuals can establish identities that may be used to access various online services, including videoconference services provided by the video conference provider 310. In this example, when users attempt to access videoconferences hosted by the video conference provider 310, the video conference provider 310 attempts to verify each participant, such as by communicating with the user identity provider 315.

When a user establishes an identity with the user identity provider 315, they provide certain personal information, such as a name, address, birth date, email address(es), etc. The user identity provider 315 may then establish an identity for the user that provides certain functionality, such as an identity indicator (e.g., an account or user name), cryptographic signatures, etc., that the user may employ to access various online services. In some examples, the user may be able to connect to the video conference provider 310 and login into an account with the video conference provider 310 using the user identity provider 315 to access functionality provided by the video conference provider 310. However, in some examples, a participant or host of a videoconference may not have, or may not want, an account with the video conference provider 310.

To accommodate such unregistered users, the video conference provider 310 may require users to provide a user identifier, such as an identity established with the user identity provider, before admitting them to a videoconference or allowing them to create a videoconference. After receiving the user's identity and potentially additional information, such as cryptographic information, the network services server(s) 314 operated by the video conference provider 310 may communicate with the user identity provider 315 to verify that the identity is valid and to authenticate the user. After verifying the user's identity, the video conference provider 310 may then admit them to a scheduled meeting, admit them to a waiting queue for a scheduled meeting, or allow them to host a scheduled meeting.

Using such a publicly available user identity provider may provide broader access to videoconferencing services without requiring individuals to register with the video conference provider. This may reduce the burden on the user, who may instead be able to use an existing identity.

Participants in a videoconference meeting taking place on system 300 use client devices 340-380 connected either using network 320 or PSTN 330. In this example, the participant using client device 340 is a host of a videoconference meeting. The host may be granted administrative privileges by the video conference provider 310 to allow client device 340 to manage meetings, such as by enabling or disabling screen sharing, muting or removing users from the meeting, admitting users from the waiting queue, creating sub-meetings or "breakout" rooms, recording meetings, etc. The administrative privileges may include the ability to monitor content in other virtual meeting rooms while subscribed to a main meeting room. Such functionality may be managed by the network services server(s) 314 at the video conference provider 310. Client devices 350, 360, and 365 are used by participant A, participant B, and participant C, respectively, to access the videoconference meeting taking place on system 300. Client device 370 is used by participant D to access the videoconference meeting taking place on system 300. The host may designate any participant as a co-host (not shown). Co-hosts, through their respective client devices, may be granted administrative privileges equal to the host by the video conference provider 310, or may have a subset of administrative privileges according to different examples, such as managing sub-meetings using their respective client devices.

Figure 4:
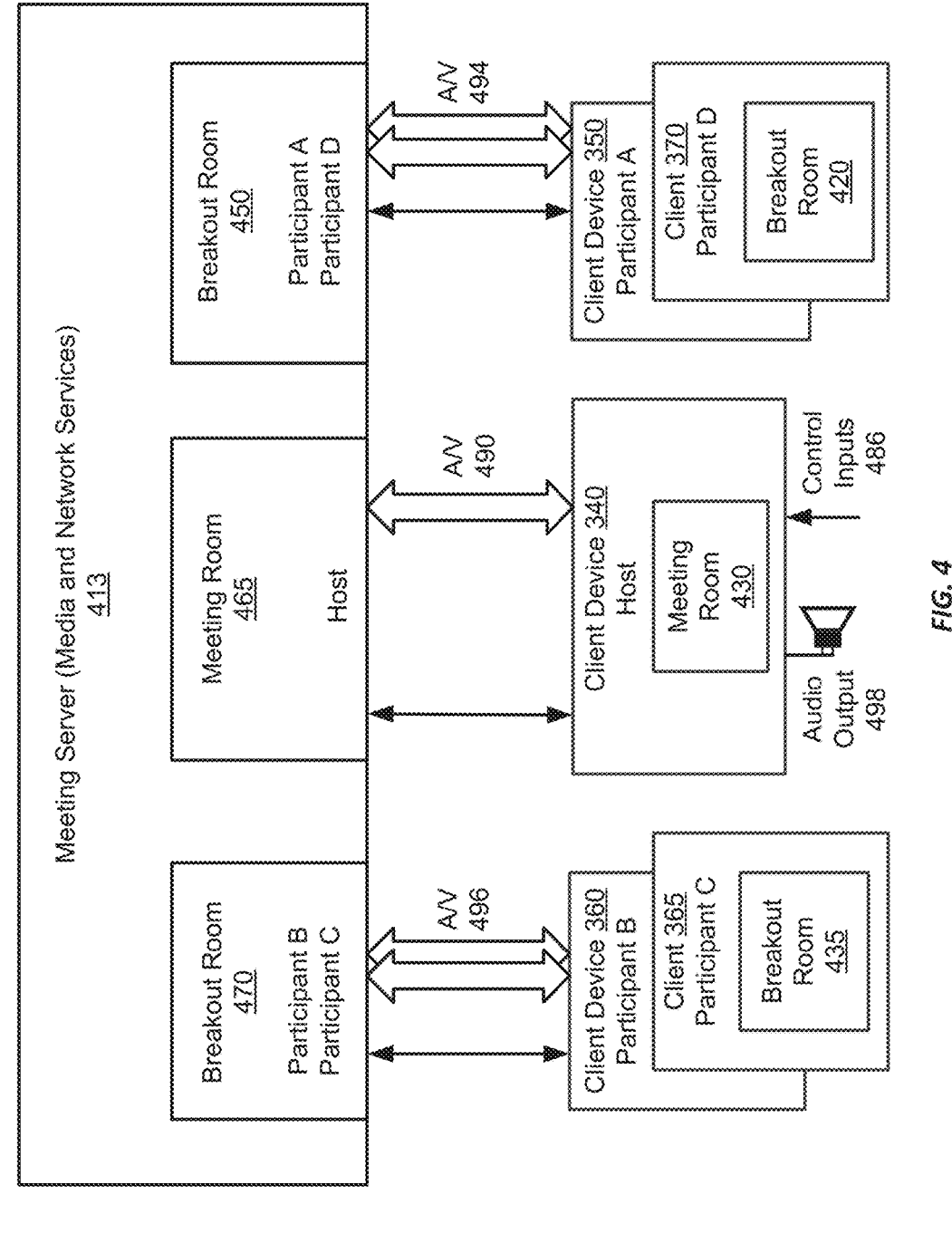

Referring to FIG. 4, FIG. 4 shows another example system 400. Example system 400 includes meeting server 413. Meeting server 413 may also be referred to as a multimedia router and can be implemented by the real-time media servers 212 working with the network services servers 214. The meeting server maintains stored representations of the virtual meetings taking place in the system so that the meeting server can keep track of the status of meetings without constantly exchanging this information with client devices. Some client devices also maintain stored representations of the meetings to which the associated participant or host is subscribed so that virtual meeting rooms can be displayed to the user. A representation of a virtual meeting room on the server or a client device may be referred to herein as a virtual meeting, a meeting room, or a room.

The main videoconference meeting (meeting room 465) can be presented to users as a first virtual meeting room with visual representations of some or all of the participants provided either by their respective video feed or an identifier, such as their name. Additional virtual meeting rooms such as breakout room (sub-meeting) 450 and breakout room 470 can each be presented to users as a virtual breakout room, similarly to how the main meeting is presented to users. System 400 can create additional breakout rooms that appear as virtual meeting rooms. Each virtual meeting room includes participants, the identities of which can be accessed and presented as a list in a user interface displayed by client devices with appropriate display capabilities. The experience of videoconferencing using virtual rooms in this example thus substantially replicates the experience of holding a gathering in a main conference room in which participants divide, or break out, into groups and meet in additional conference rooms or offices.

System 400 includes a main meeting representation 430 maintained on host client device 340 and main meeting representation 465 on meeting server 413. In this example, the host is the only user in the main meeting room. System 400 also includes a first breakout room (sub-meeting) representation 420 on participant client device 350 and on participant client device 370, as well as a corresponding first breakout room representation 450 on meeting server 413. In this example, participant A and participant D are in the first virtual breakout room. System 400 also includes a second breakout room representation 435 on participant client device 360 and on participant client device 365, as well as a corresponding second breakout room representation 470 on meeting server 413. In this example, participant B and participant C are in the second breakout room.

In system 400, participants and hosts, through their respective client devices maintain an active data connection for each virtual room in which they are present, or to which they are subscribed. These data connections are illustrated with the single width, two-headed arrows in FIG. 4, FIG. 5, and FIG. 6. The data connections are used for control, presence indication, chat, and other similar functions and can be maintained using TCP. For example, audio and monitoring control inputs by the host as described herein can be provided through control inputs 486 and forwarded to meeting server 413. Other client devices also have control inputs, which are omitted from FIG. 4 for clarity. Additionally, audio/video (A/V) streams carry video and audio for each virtual room between the server 413 and the client devices. A/V stream 490 serves the main meeting room in system 400 and provides and A/V connection for client device 340. A/V streams 494 serve the first breakout room and provide an A/V connections for client devices 350 and 370. A/V streams 496 serve the second breakout room A/V connections for client devices 360 and 365. A/V streams can be provided using UDP. Audio for the host received through A/V stream 490 can be provided to audio output 498 of host client device 340. Other client devices also have audio outputs, which are omitted from FIG. 4 for clarity. System 400 is configured so that the host is present in and maintaining awareness of activities in only the main meeting room, while the other participants are present in and maintaining awareness of activities only in their respective breakout rooms.

Figure 5:
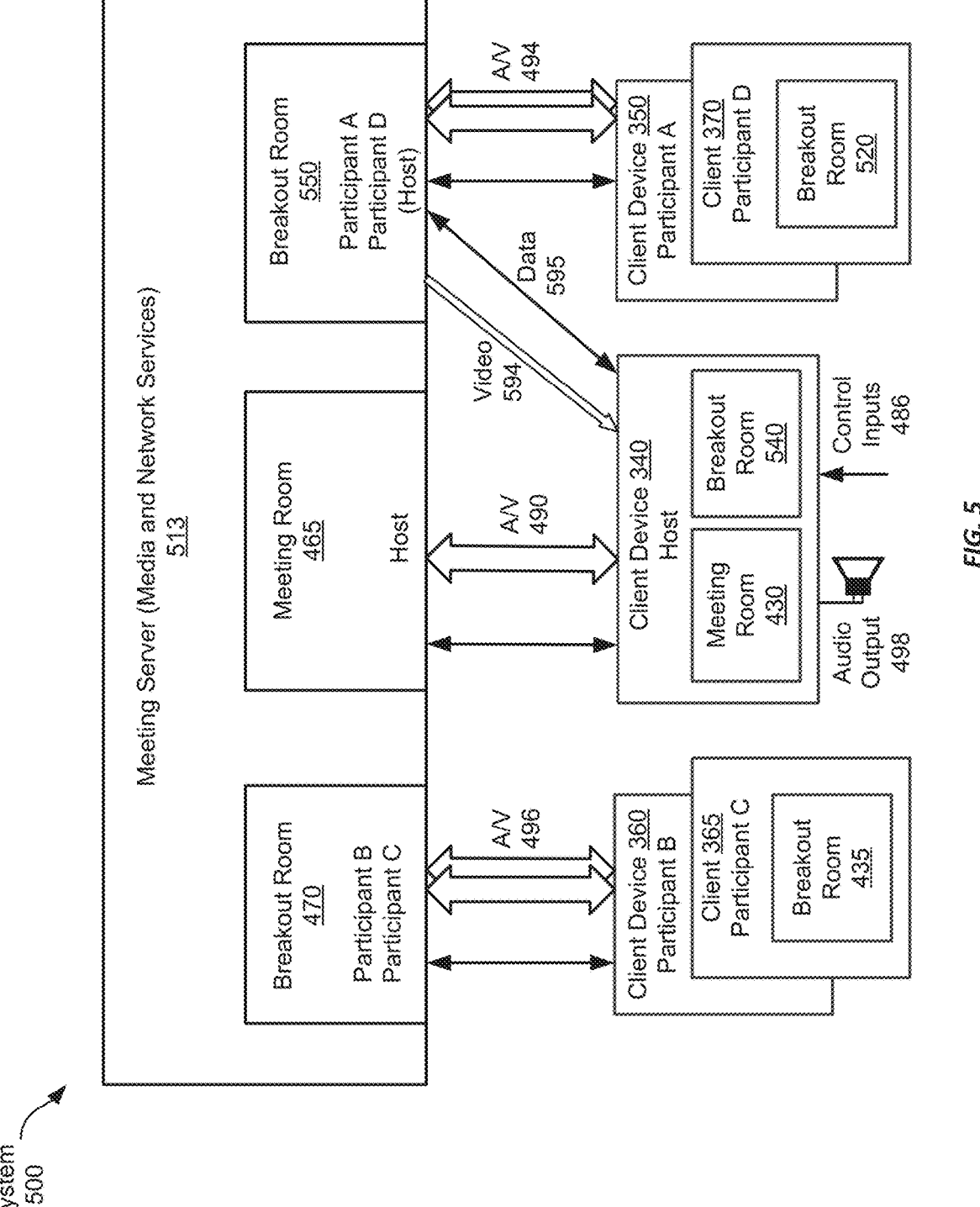

Referring to FIG. 5, FIG. 5 shows another example system 500 for providing virtual meeting room content monitoring for a host of a videoconference. System 500 is similar to 400, except that the connections reflect that the host has provided a control input 486 indicative of a request from the host to monitor breakout room (sub-meeting) content for the breakout room 550 occupied by Participant A and participant D. Thus, host client device 340 is receiving video stream 594 for first breakout room 550, and the host identifier (host) is displayed in that room so that participants know that the host is monitoring the room, though in some examples, the host's identifier may not be displayed in the first breakout room 550. The actual identifier in some examples is a name or similar designator as would be seen if the host had actually entered the breakout room. The first breakout room is maintained as breakout room 520 on client devices 350 and 370. Data connection 595 is also established between the host client device 340 and breakout room 550 on meeting server 513.

In system 500, the host is a participant in the main meeting. Thus, to prevent the host from receiving two audio streams at once, the host can choose to monitor only the video from the breakout room, either or both of the participant video feed or the shared screen content from the breakout room. The host can then monitor the audio from only the main meeting room or only the breakout room. Though in some examples, the host may have the option to receive audio streams from both the main meeting room 465 and the breakout room 550, such as by reducing the volume of one of the two audio streams, or by playing each audio stream from a different audio output device, e.g., the main meeting room audio is played from the left speaker and the breakout room audio is played from the right speaker.

Additional control inputs may allow the host to switch between video of the active participant or shared content, such as documents or slides. An audio control input at the host device can be used to change an audio output target of the host client device between the main meeting and the sub-meeting. Breakout room representation 540 corresponds to breakout room representation 550 and is maintained on host client device 340 along with the main meeting room representation 430. The video from the breakout room can optionally be displayed concurrently with the video for the main meeting room on client device 340. However, in the example of FIG. 5, audio output 498 is configured to target and provide audio from the main meeting room, since the sounds from the two virtual meeting rooms would likely overlap, be difficult to understand, and may lack saliency if they were output to the host at the same time.

Figure 6:
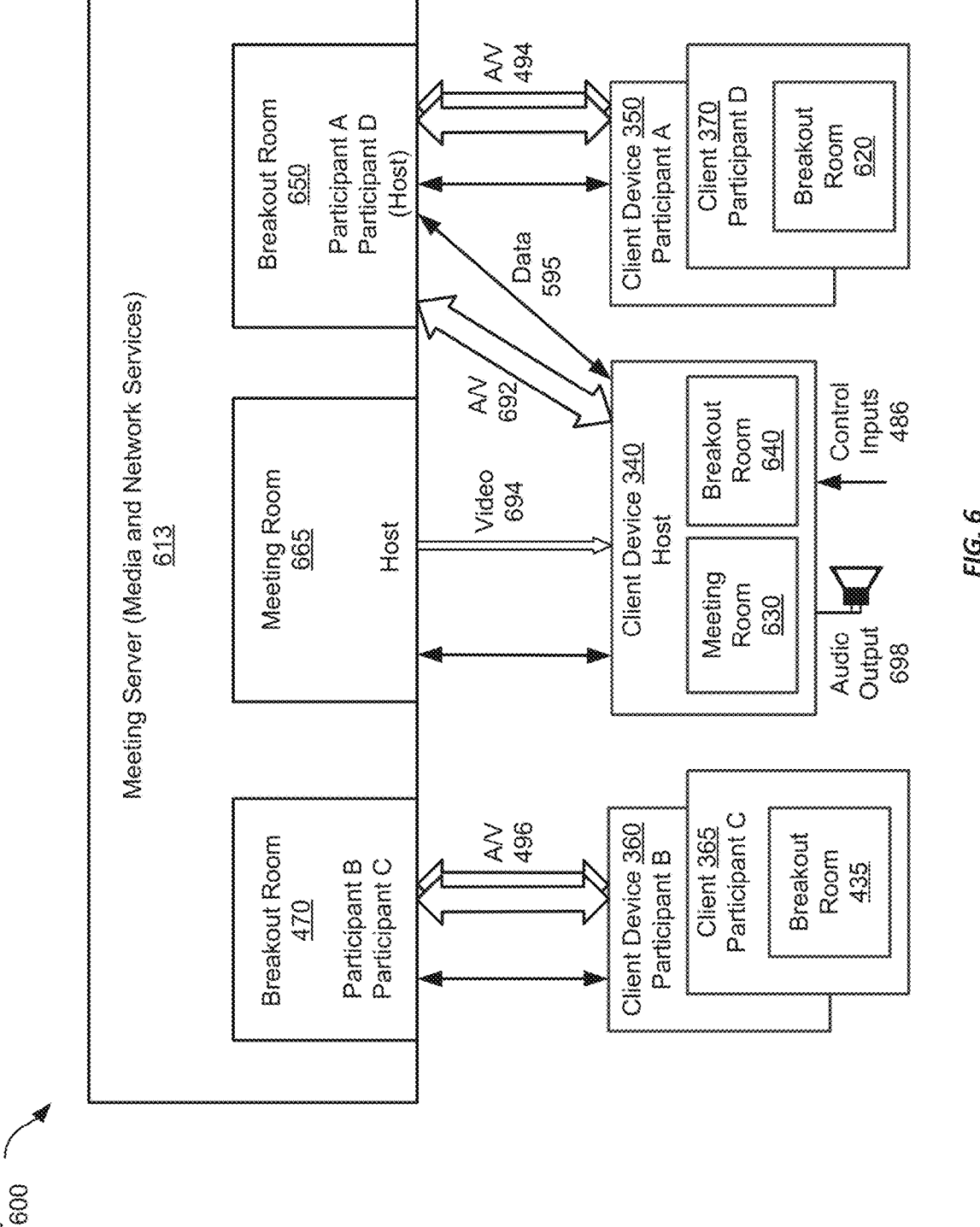

Referring to FIG. 6, FIG. 6 shows another example system 600 for providing virtual meeting room content monitoring for a host of a videoconference. System 600 is similar to 500, except that the connections reflect that the host has provided a control input 486 indicative of toggling the audio output 698 from targeting the main meeting where the host is in attendance to targeting the breakout room for which the host is monitoring content. Thus, host client device 340 is receiving video stream 694 from the main meeting room with representation 665 on the server and is receiving audio and video via A/V stream 692 from the first breakout room in which participant A and participant D are virtually present. Data connection 595 is also established between the host client device 340 breakout room 650 on meeting server 613.

In system 600, the host is a participant in the main meeting, but is receiving audio from the breakout room. To prevent the host from receiving two audio streams at once, the host can choose to monitor only the video from the main meeting room, either or both of the participant video feed (if any), or shared screen content from the main meeting room. Breakout room representation 640 corresponds to breakout room representation 650 and is maintained on host client device 340 along with the main meeting room representation 630. Breakout room representation 620 is maintained on client device 350 and on client device 370 for participants A and D, respectively. The video from the breakout room can optionally be displayed concurrently with the video for the main meeting room on client device 340. However, audio output 698 is configured to target and provide audio from the main meeting room.

In some examples, the system can provide that host with the capability to target and provide audio from multiple meeting rooms, either a main meeting and one or more sub-meetings, or multiple sub-meetings. In some examples, the system can be configured to activate or change audio targets based upon detected events. In other examples, the same or similar audio and video connections as shown for system 600 can result from the host being subscribed to the breakout room 640 on host client device while monitoring content from the main meeting room as a second virtual meeting room. In other examples, the host can be subscribed to the first breakout room and monitor content from the breakout room corresponding to breakout room representation 470 on the server as a second virtual meeting room.

Referring now to the method 700 illustrated in FIG. 7, FIG. 7 shows an example method 700 for providing virtual meeting room content monitoring for a host of a videoconference. The description of the method 700 in FIG. 7 will be made with reference to the systems 500 and 600 shown in FIG. 5 and FIG. 6; however any suitable system according to this disclosure may be used, such as the example systems 100, 200, 300, and 400, shown in FIGS. 1, 2, 3 and 4.

At block 710, a processor at a video conference provider establishes a videoconferencing session with a first virtual meeting room, such as a main meeting room 465. At block 720, the processor establishes one or more additional virtual meeting rooms, such as breakout room 470 and breakout room 550, which are associated with the main meeting room 465.

At block 730, the processor receives a control input 486 from the host through host client device 340, requesting to monitor meeting content from a second virtual meeting room while the host is subscribed to the first virtual meeting room. For example, the host can be in the main meeting room 465 and, thus, subscribed to the main meeting and send a request to monitor content from a sub-meeting, such as breakout room 550. In another example, the host may be in a breakout room and request to monitor content from the main meeting room or another breakout room. Further, in some examples, the host may issue a request to monitor multiple other meetings. For example, the host may be a teacher overseeing a class that has been split into multiple breakout rooms and may wish to view video feeds from each of the breakout rooms to ensure the students are all staying on task or to monitor their progress. In such an example, the control input may identify multiple different sub-meetings to be monitored.

It should be appreciated that a request to monitor a sub-meeting may include information indicating whether the request should override a prior request to monitor a sub-meeting (whether the same sub-meeting or a different one) or should be in addition to a prior request. For example, if the meeting host is participating in the main meeting room, they may request to monitor a first breakout room at one time and, subsequently, issue a request to monitor a second breakout room. The host may select whether the request terminates the monitoring of the first breakout room or the request maintains monitoring of the first breakout room and adds monitoring of the second breakout room. Thus, by issuing multiple requests over time, the host may add additional sub-meetings to be monitored or remove sub-meetings from being monitored.

At block 740, the meeting server, for example meeting server 513, provides the meeting content from the second virtual meeting room to host client device 340 while the host is subscribed to and is receiving content from the first virtual meeting room. For example, meeting server 513 provides video content from breakout room 550 to host client device 340, and host client device 340 outputs the video content from the breakout room as well as both the audio and video content from the main meeting room. In this example, to provide the content, the meeting server 513 provides information to the host's client device 340 to enable it to subscribe to the video or audio streams of the identified breakout room, such as by providing a uniform resource identifier ("URI"), such as a uniform resource locator ("URL"), for one or more of the video or audio streams available in the breakout room.

At block 750, an audio control input may be received from the host at host client device 340. The audio control input may be indicative of which virtual meeting room is the audio output target for the host client device.

At block 760, the audio output target can be changed in response to the audio control input to monitor audio from another virtual meeting room, for example, either the second breakout room or the main meeting room in system 500. As a further example, audio at the host client device 340 is being provided from the main meeting room in system 500. However, in the example system 600, audio from the first breakout room is being provided to host client device 340 in system 600. A/V stream 692 includes audio and video content from breakout room 650 and video stream 694 provides video from the main meeting room.

Audio control input received at block 750 can be directed to selecting a single audio output target. In some examples, the audio control input can be directed to selecting multiple audio output targets. In such a case, the audio output target is set at block 760 to monitor the audio from multiple virtual meeting rooms. While independent sounds from two or more virtual meeting rooms would likely overlap and be difficult to understand, it may still be desirable for a host to monitor sound from multiple virtual meeting rooms at the same time. In examples where the host can receive multiple simultaneous audio streams from different meeting/sub-meeting rooms, the host may select options to change the volume or mute audio from any individual audio stream, such as to help the host focus on one audio stream.

A change in the audio output target of the host client device at block 760 in some examples may occur automatically rather than in response to an audio control input received from the host. For example, a videoconferencing system can be configured to automatically select audio from a breakout room or the main room when a certain event is detected, for example, a loud sound, or an extended period without sound. Such a system configuration can automatically capture the attention of a meeting host when the hosts attention may be needed due to an event in one of the virtual rooms of a videoconferencing session.

Figure 8:
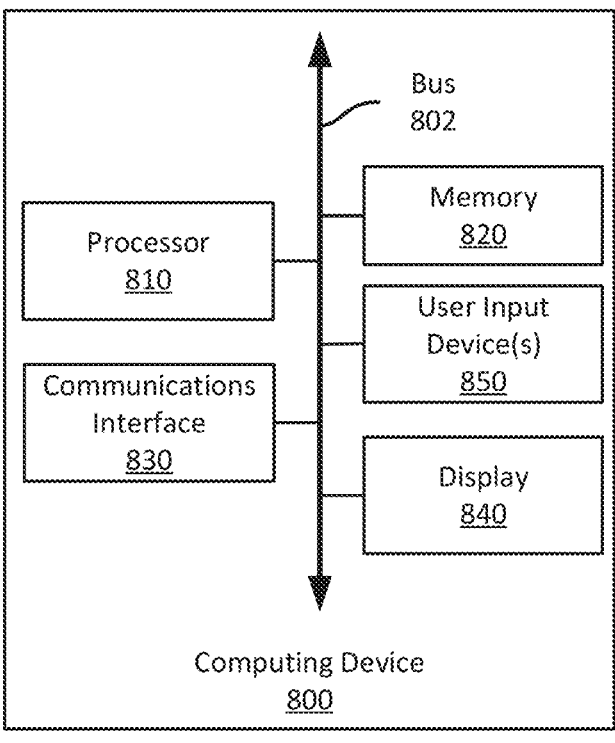
FIG. 8 shows an example computing device suitable for use with any disclosed systems or methods according to this disclosure.

Referring now to FIG. 8, FIG. 8 shows an example computing device 800 suitable for use in example systems or methods for content monitoring for virtual waiting rooms. The example computing device 800 includes a processor 810 which is in communication with the memory 820 and other components of the computing device 800 using one or more communications buses 802. The processor 810 is configured to execute processor-executable instructions stored in the memory 820 to perform one or more methods for providing content monitoring for a host of a videoconference, such as part or all of the example method 700, described above with respect to FIG. 7. The computing device, in this example, also includes one or more user input devices 850, such as a keyboard, mouse, touchscreen, video input device (e.g., one or more cameras), microphone, etc., to accept user input. The computing device 800 also includes a display 840 to provide visual output to a user.

The computing device 800 also includes a communications interface 830. In some examples, the communications interface 830 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:

establishing a videoconferencing session having a virtual main meeting room and a virtual sub-meeting room associated with the virtual main meeting room;

receiving a monitoring control input from a host at a host client device, the host present in the virtual main meeting room while at least one participant is present in the virtual sub-meeting room;

responsive to the monitoring control input from the host, causing meeting room content of the virtual sub-meeting room to be displayed on the host client device while the host is present in the virtual main meeting room;

receiving, using a data connection from the host client device to a meeting server, a video control input indicative of a selection by the host to switch the meeting room content of the virtual sub-meeting room between active participant video and shared content while the host is present in and monitoring audio from the virtual main meeting room; and displaying, responsive to the video control input, the active participant video or the shared content from the virtual sub-meeting room.

2. The method of claim 1, further comprising:

receiving an audio control input from the host at the host client device; and changing an audio output target of the host client device between the virtual main meeting room and the virtual sub-meeting room based on the audio control input.

3. The method of claim 2, further comprising setting an audio target of the host client device to the virtual sub-meeting room while the host client device concurrently displays both virtual main meeting room video and virtual sub-meeting room video.

4. The method of claim 1, wherein the monitoring control input is indicative of a request from the host to monitor both the virtual sub-meeting room and an additional sub-meeting room while present in the virtual main meeting room.

5. The method of claim 1, further comprising displaying a host identifier on a participant client device, the host identifier indicative of the host monitoring content of the virtual sub-meeting room.

6. The method of claim 1, further comprising automatically selecting an audio output target of the host client device as the virtual main meeting room or the virtual sub-meeting room in response to a detected event for which the host client device or a meeting server is configured to prompt attention from the host.

7. The method of claim 6, wherein the detected event comprises an audio volume event.

8. A system comprising:

a processor; and at least one memory device including instructions that are executable by the processor to cause the processor to:

establish a videoconferencing session having a virtual main meeting room and a virtual sub-meeting room associated with the virtual main meeting room;

receive a monitoring control input from a host at a host client device, the host present in the virtual main meeting room while at least one participant is present in the virtual sub-meeting room;

responsive to the monitoring control input from the host, cause meeting room content of the virtual sub-meeting room to be displayed on the host client device while the host is present in the virtual main meeting room;

receive, using a data connection from the host client device to a meeting server, a video control input indicative of a selection by the host to switch the meeting room content of the virtual sub-meeting room between active participant video and shared content while the host is present in and monitoring audio from the virtual main meeting room; and display, responsive to the video control input, the active participant video or the shared content from the virtual sub-meeting room.

9. The system of claim 8, wherein the instructions are further executable to cause the processor to:

receive an audio control input from the host at the host client device; and change an audio output target of the host client device between the virtual main meeting room and the virtual sub-meeting room based on the audio control input.

10. The system of claim 9, wherein the instructions are further executable to cause the processor to set an audio target of the host client device to the virtual sub-meeting room while the host client device concurrently displays both virtual main meeting room video and virtual sub-meeting room video.

11. The system of claim 8, wherein the monitoring control input is indicative of a request from the host to monitor both the virtual sub-meeting room and an additional sub-meeting room while present in the virtual main meeting room.

12. The system of claim 8, wherein the instructions are further executable to cause the processor to display a host identifier on a participant client device, the host identifier indicative of the host monitoring content of the virtual sub-meeting room.

13. The system of claim 8, wherein the instructions are further executable to cause the processor to automatically select an audio output target of the host client device as the virtual main meeting room or the virtual sub-meeting room in response to an audio volume event for which the host client device or a meeting server is configured to prompt attention from the host.

14. A non-transitory computer-readable medium comprising code that is executable by a processor for causing the processor to:

establish a videoconferencing session having a virtual main meeting room and a virtual sub-meeting room associated with the virtual main meeting room;

receive a monitoring control input from a host at a host client device, the host present in the virtual main meeting room while at least one participant is present in the virtual sub-meeting room;

responsive to the monitoring control input from the host, cause meeting room content of the virtual sub-meeting room to be displayed on the host client device while the host is present in the virtual main meeting room;

receive, using a data connection from the host client device to a meeting server, a video control input indicative of a selection by the host to switch the meeting room content of the virtual sub-meeting room between active participant video and shared content while the host is present in and monitoring audio from the virtual main meeting room; and display, responsive to the video control input, the active participant video or the shared content from the virtual sub-meeting room.

15. The non-transitory computer-readable medium of claim 14, wherein the code is further executable for causing the processor to:

receive an audio control input from the host at the host client device; and change an audio output target of the host client device between the virtual main meeting room and the virtual sub-meeting room based on the audio control input.

16. The non-transitory computer-readable medium of claim 15, wherein the code is further executable for causing the processor to set an audio target of the host client device to the virtual sub-meeting room while the host client device concurrently displays both virtual main meeting room video and virtual sub-meeting room video.

17. The non-transitory computer-readable medium of claim 14, wherein the monitoring control input is indicative of a request from the host to monitor both the virtual sub-meeting room and an additional sub-meeting room while present in the virtual main meeting room.

18. The non-transitory computer-readable medium of claim 14, wherein the code is further executable for causing the processor to display a host identifier on a participant client device, the host identifier indicative of the host monitoring content of the virtual sub-meeting room.

19. The non-transitory computer-readable medium of claim 14, wherein the code is further executable for causing the processor to automatically select an audio output target of the host client device as the virtual main meeting room or the virtual sub-meeting room in response to a detected event for which the host client device or a meeting server is configured to prompt attention from the host.

20. The non-transitory computer-readable medium of claim 19, wherein the detected event comprises an audio volume event.

* * * * *